United States Patent
Swann

[15] 3,643,718
[45] Feb. 22, 1972

[54] FOOD-SLICING MACHINES
[72] Inventor: William Richard Swann, Rudgwick, Nr. Horsham, Sussex, England
[73] Assignee: Jessett & Henry (Food Machinery) Limited, Feltham, Middlesex, England
[22] Filed: July 7, 1969
[21] Appl. No.: 839,425

[52] U.S. Cl. ............................................146/94, 146/101
[51] Int. Cl. ..........................................................B26d 1/18
[58] Field of Search ............................................146/94, 101

[56] References Cited

UNITED STATES PATENTS

| 2,166,648 | 7/1939 | Swofford | 146/101 |
| 2,528,914 | 11/1950 | Roest et al. | 146/101 |
| 3,428,102 | 2/1969 | Knecht et al. | 149/94 X |

FOREIGN PATENTS OR APPLICATIONS 798,637  7/1958  Great Britain..........................146/101

Primary Examiner—William S. Lawson
Attorney—Scrivener, Parker, Scrivener and Clarke

[57] ABSTRACT

A solid food slicer for bacon and the like including a pair of circular blades journaled at the opposite ends of an elongated centrally pivoted rotor driven about a horizontal axis in a vertical plane. The blades are driven in a direction opposite to that of the rotor by a double pulley coaxial with but rotatable independently of the rotor drive shaft, a belt engaging one portion of the double pulley and both of a pair of drive pulleys attached to the respective rotatable cutting blades. The second belt engages the other portion of the double pulley to couple the same to a drive motor.

8 Claims, 5 Drawing Figures

FOOD-SLICING MACHINES

The present invention relates to apparatus for slicing solid food material, such as bacon, cooked meat, bread, etc.

According to the present invention, apparatus for slicing solid food material comprises a frame on which is journaled an elongated rotor for rotation about a horizontal axis. Two circular cutting blades are journaled to opposite ends of the rotor for rotation about an axis slightly inclined relative to the rotational axis of the rotor. A driving pulley is coupled to each cutting blade and a double pulley is journaled coaxially about but rotatable independently of the drive shaft of the rotor, belt means being provided and engaging one pulley portion of the double pulley and both of the driving pulleys of the cutting blades. Second belt means drivingly connect a drive motor to the other portion of the double pulley with means being provided for rotating the driving shaft of the elongate rotor in the opposite rotational direction to that of the double pulley.

The invention will be further described, by way of example, with reference to the accompanying drawings, in which.

Figure 1:
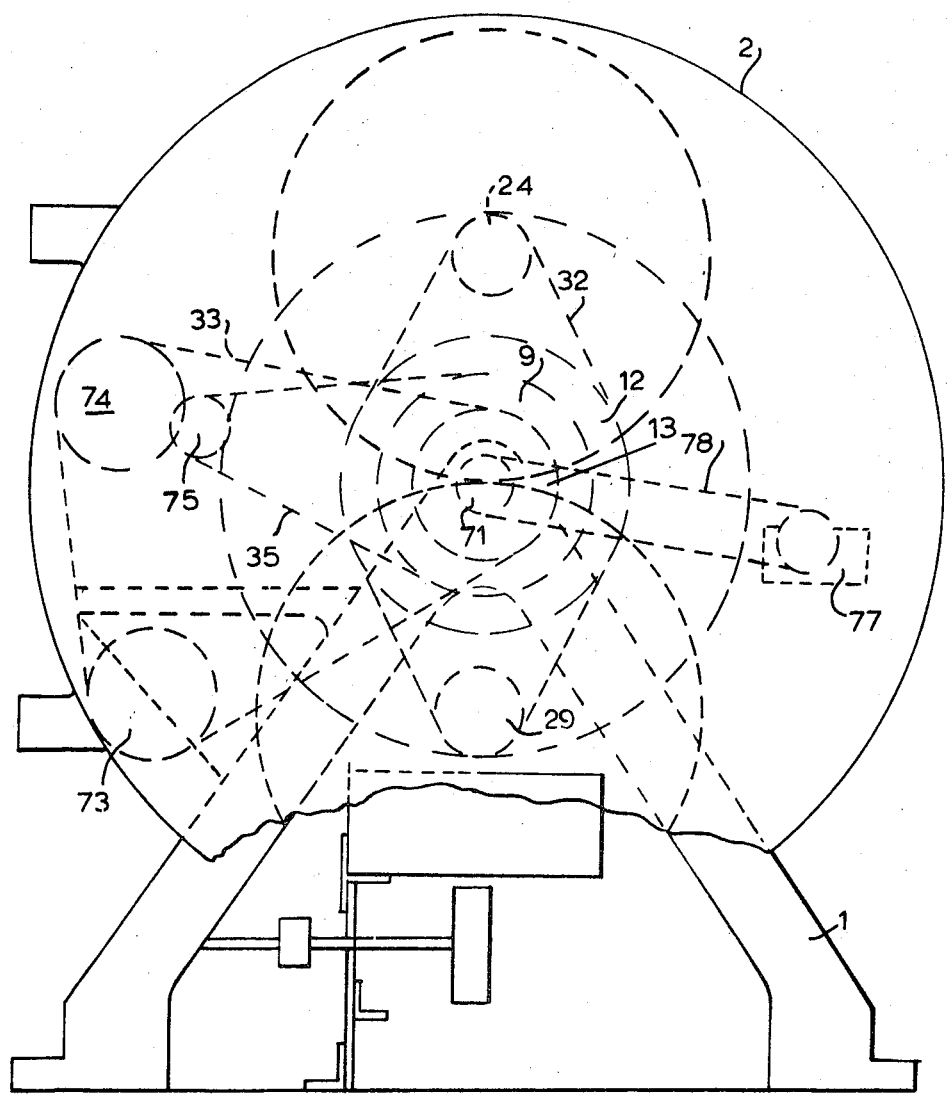
FIG. 1 is a diagrammatic front elevation of one embodiment of apparatus constructed according to the present invention for slicing bacon.
Figure 2:
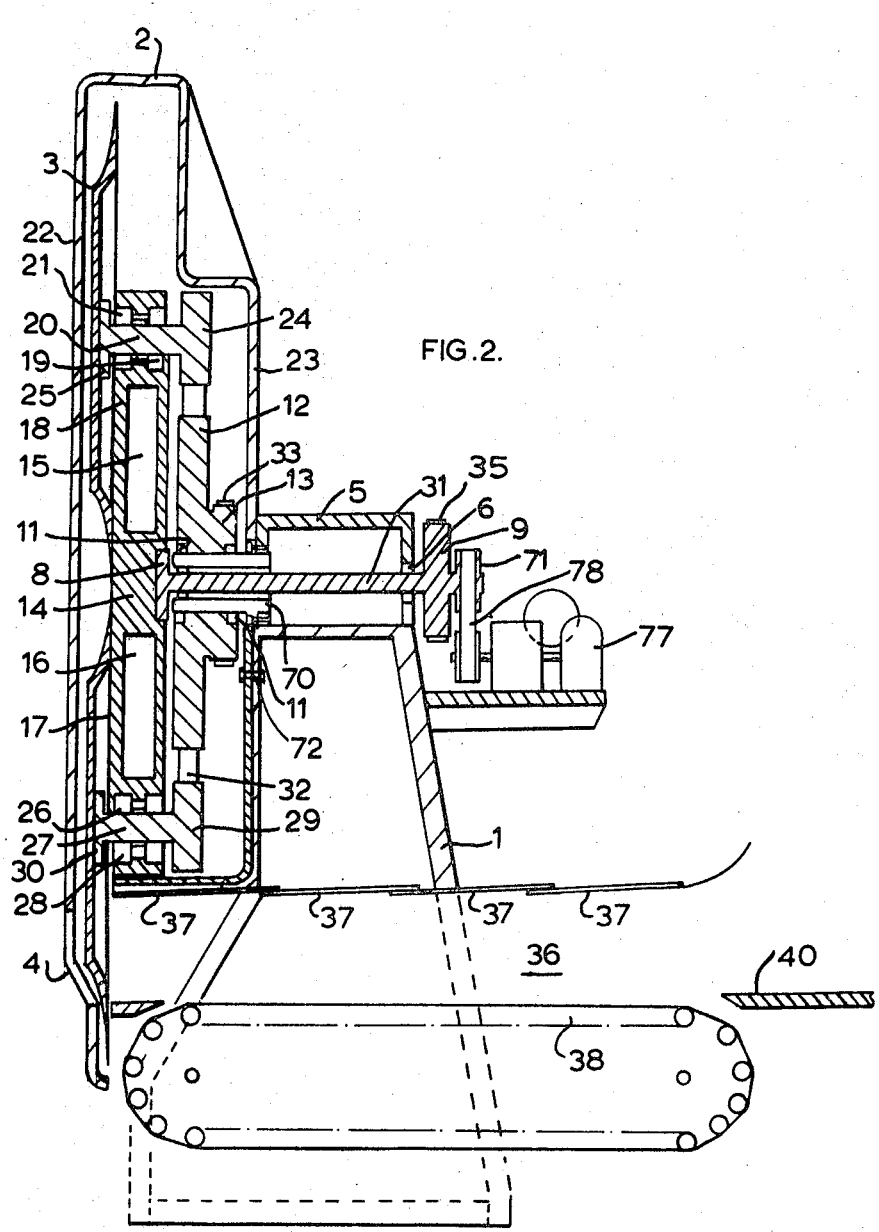
FIG. 2 is a diagrammatic sectional side elevation of the apparatus of FIG. 1.

FIGS. 1 and 2 illustrate the most important features of a slicing apparatus for slicing bacon. The apparatus includes a pair of cutting blades 3 and 4 adapted to be rotated within a housing 2. The housing 2 is generally cylindrical, having a front cover 22 and a rear cover 23, the longitudinal dimension of the housing 2 being substantially smaller than its radial dimension. The housing 2 is mounted on a supporting frame 1 and attached thereto by means of bolts 72. A hollow frame member 5 is mounted on the frame 1 engagement with the housing 2. A cylindrical tubular member 70 is connected to the frame member 5 so as to extend coaxially within the housing 2, a shaft 31 being journaled coaxially within the tubular member 70 and the frame member 5 by bearings 7 and 6 respectively.

The end of the shaft 31 which extends into the housing carries a cylindrical boss 8. The other end of the shaft 31 extends from the frame member 5 in a direction away from the housing and carries a pair of adjacent pulleys 9,71.

A double pulley 10, having a large diameter portion 12 and a small diameter portion 13, is journaled coaxially on the tubular member 70 by means of bearing 11 so that it is capable of free rotation on the tubular member 7 within the housing 2.

The cylindrical boss 8 is rigidly keyed to an elongated carrier in the form of a rotor 14 having symmetrical arms 17 and 18. The rotor 14 is cast with recesses 15 and 16 in the arms 18 and 17 respectively and is mounted on the boss 8 such that rotation of the shaft 31 rotates the arms 17 and 18 in a plane perpendicular to the longitudinal axis of the shaft 31 which axis is longitudinal.

The extremity of the outer arm 18 has a bore 19 in which a shaft 20 is journaled in bearings 21. The end of the shaft 20 which is nearest the rear cover 23 carries a pulley 24. The pulley 24 is arranged to lie in substantially the same plane as the pulley 12, their respective of rotation being substantially, but not quite, parallel. The other end of the shaft 20 carries a boss 25 to which the circular cutting blade 3 is rigidly attached.

In a similar manner the outer extremity of the arm 17 has a bore 26 in which a shaft 27 is journaled in bearings 28. The end of the shaft 27 which is nearest the rear cover 23 carries a pulley 29. The pulley 29 is arranged to lie in substantially the same plane as the pulley 12, their respective axes of rotation being substantially, but not quite, parallel. The other end of the shaft 27 carries a boss 30 to which the circular cutting blade 4 is rigidly attached. A closed belt 32 engages the pulleys 24, 29 and 12.

A second closed belt 33 engages the pulley 13, a motor-driven pulley 73 and a drive pulley 74 of a variable speed drive (not shown) for the shaft 31. Rotation of the pulley 13 by the motor driven pulley 73 causes the pulleys 24 and 29 to be driven via the belt 32 and hence the cutting blades 3 and 4 to be rotated in the bearings 21 and 28, respectively.

A third closed belt 35 engages the pulley 9 on the shaft 31 and also engages a further pulley 75 drivable by the variable speed drive 76. Rotation of the pulley 9 by the variable speed drive 76 effects rotation of the arms 17 and 18 relative to the frame member 5.

In the present embodiment the pulley 9 and the cutting blades 3, 4 are arranged to rotate in opposite directions at rotational speeds of approximately 240 r.p.m. and 3,000 r.p.m. respectively. The required rotational speeds are given to the cutting blades by appropriate choice of pulley sizes and gear ratios in the variable speed drive.

The shafts 20 and 27 on which the cutting blades 3 and 4 rotate are arranged to be at a slight angle to the shaft 31 on which the rotor 14 rotates so that the blades 3, 4 do not quite lie in a plane perpendicular to the rotor axis, for a reason which will be explained below. Although the three pulleys 24, 29, 12 do not, therefore, lie in a single plane, the inclination of the blade axes is sufficiently small for the belt 32 to satisfactorily drivingly engage all three pulleys.

Means are provided at the lower end of the cutting mechanism described above for feeding pieces of bacon, which are to be sliced, to the rotating cutting blades 3,4. A bacon-receiving passage 36 is formed between a set of pressure plates 37 arranged in a steplike manner so that each plate overlaps a portion of an adjacent plate and a spike slat chain 38 having a plurality of hingelike joints between the slats of the chain. The chain 38 may be driven continuously by a second variable speed drive 77 which is driven from the main shaft 31 by the pulley 71 and a belt 78 and which determines the rate of progress of a piece of bacon along the passage 36 towards a slicing station 112 located at an opening in the lower side of the housing 2 vertically below the rotational axis of the rotor 14.

In use, pieces of bacon are placed on a fixed platform 40 at the inlet to the passage 36 on the rear of the machine and fed continuously along the passage 36 to the slicing station 112.

The shafts 20 and 27 are aligned relative to the rotor 14 such that two conditions are met when each blade is in its lowermost position, corresponding to the position occupied by the shaft 27 in FIGS. 1 and 2 in which the shaft 27 lies vertically below the axis of the rotor shaft 31. Firstly, the rotational axis of the blade lies in a horizontal plane and, secondly, the rotational axis of the blade is inclined relative to the feeding direction of the conveyor 38, which feeding direction is parallel to the axis of rotation of the rotor 14, with the instantaneous trailing edge of the blade, considered in the direction of movement of the blade brought about by rotation of the rotor 14, further from the inlet 36' than the leading edge. This arrangement enables the bacon to be fed continuously during a slicing action of the blades without jamming of the bacon against the blade performing a slice, since the displacement in the feeding direction of that part of a piece of bacon which has already been cut in that slicing action can be accommodated behind the inclined blade. The slice thickness may be varied by changing the speed of the chain 38 and hence the feeding velocity of the bacon pieces.

Figure 3:
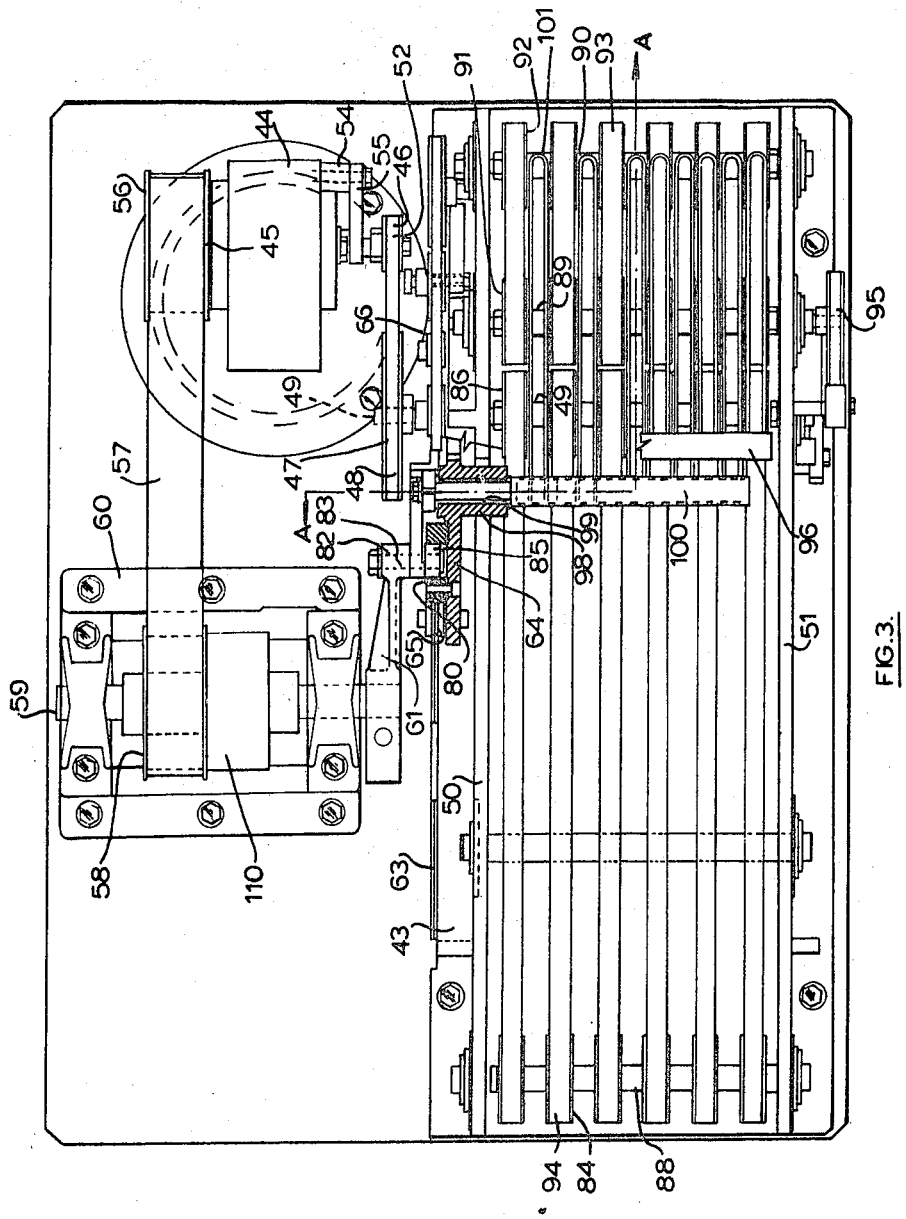
FIG. 3 is a plan view, partly in section, of one embodiment of a batching unit for operation with the apparatus of FIG. 1.
Figure 4:
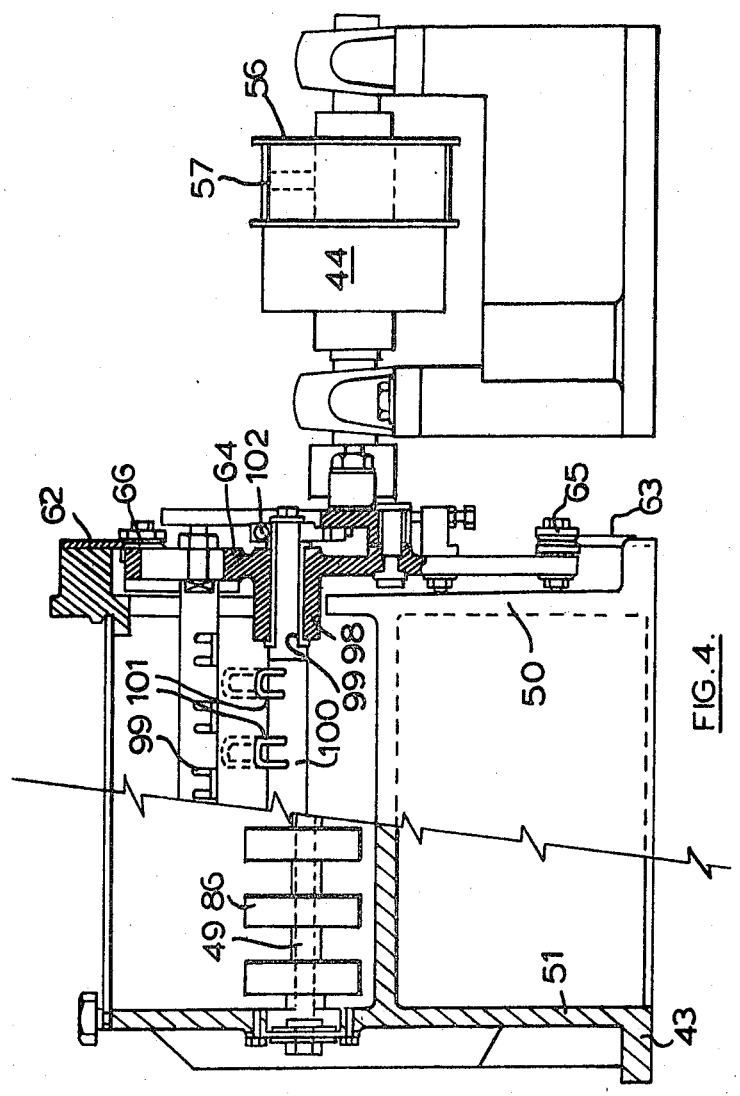
FIG. 4 is an end elevation, partly in section of the batching unit of FIG. 3.
Figure 5:
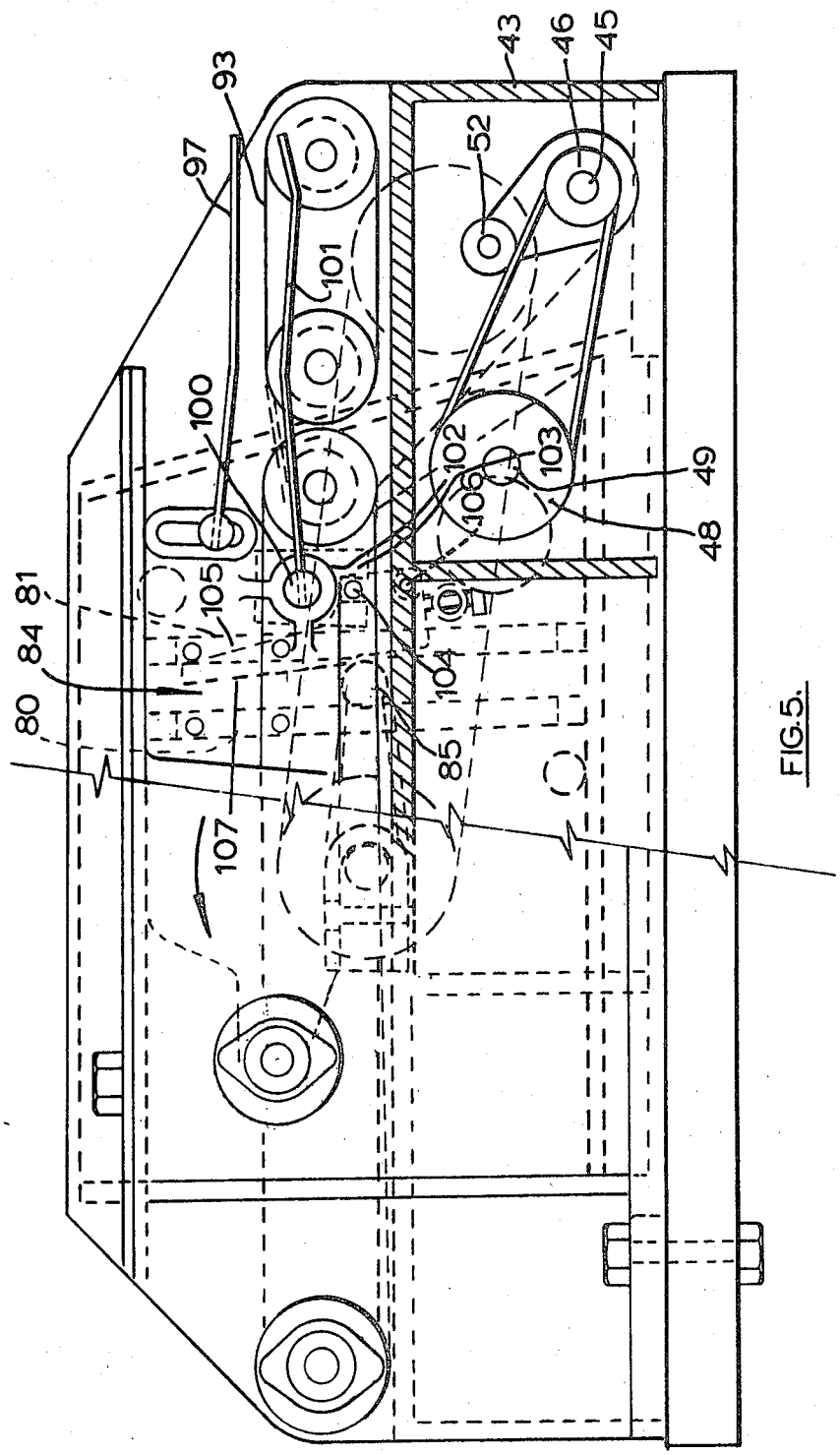
FIG. 5 is a side elevation, partly in section, of the batching unit of FIG. 3.

FIGS. 3,4 and 5 illustrate the most important features of a batching unit the purpose of which is to receive the bacon slice from the cutting mechanism and to transfer them to a delivery conveyor in batches of between four and ten slices, separated by distances of 6 inches to 1 foot. Each batch is to be "shingled," that is, the slices are to be laid so that each slice overlaps a portion of the slice below.

The batching unit includes a main frame member 43 which is of generally rectangular boxlike shape. An electric motor is located at one side of said frame member 43 adjacent one end thereof. The electric motor has a vertical shaft which drives a horizontal shaft 45 by means of a worm reduction gear 44 mounted above the motor. The shaft 45 projects from opposite sides of a housing of the reduction gear 44, and is arranged to be substantially perpendicular to the longitudinal axis of the frame member 43. The end of the shaft 45 nearest to the frame member 43 carries a pulley 46. A belt 47 operably connects the pulley 46 to a pulley 48 which is carried by a shaft 49 journaled in parallel sidewalls 50, 51 of the frame member 43. The axis of the shaft 49 is parallel to the shaft 45 of the motor 44. A tensioner pulley 52, rotatably carried by an arm 55 which is attached by a pillar 54 to a housing of the reduction gear 44, engages the belt 47.

The projecting end of the motor-driven shaft 45 remote from the frame member 43 carries a pulley 56. The pulley 56 is operably connected by a belt 57 to a pulley 58 which is freely carried by a shaft 59 journaled in a subframe 60. The axis of the shaft 59 is parallel to the shaft 45. A single revolution clutch 110 is also arranged on the shaft 59. When actuated the clutch 110 operably connects the pulley 58 to the shaft 59, allowing the shaft 59 to be rotated once through a complete revolution. One end of the shaft 59 extends from the subframe 60 towards the frame wall 50 and has a crank arm 61 rigidly attached thereto. The crank arm 61 is arranged such that it rotates in a plane parallel to said frame wall 50 when the shaft 59 is rotated.

The frame wall 50 is provided with a pair of horizontal rails, an upper rail 62 being located vertically above and parallel to a lower rail 63. A carriage 64 is provided with runners 65, 66 which operably engage the rails 63 and 62, respectively. Each runner 65, 66 comprises a rotatably mounted disc having a circumferential groove for engaging its respective rail.

The carriage 64 is provided with a substantially vertically extending uniform slot 84 of uniform width formed between two members 80, 81. The outer end of the crank arm 61 has a bore 82 in which a pin 83 is rotatably mounted such that one end of the pin 83 extends into the slot 84. This end of the pin 83 rotatably carries a cam follower 85 whose diameter is slightly less than the width of the slot 84.

Rotation of the crank arm 61 by the shaft 59 causes the carriage 64 to be reciprocated parallel to the longitudinal axis of the frame member 43, the guide pulley 85 performing a reciprocating motion in the vertically extending slot 84.

The shaft 49 carrying the pulley 48 has a plurality of equally spaced pulleys 86 rigidly attached thereto in the region between the sidewalls 50, 51. A shaft 88 is journaled between the sidewalls 50, 51 at the end of the frame member 43 remote from said aforementioned one end and has a plurality of further pulleys 87 rigidly mounted thereon. The shaft 88 is arranged to be parallel to the shaft 49, and each pulley 87 to be located opposite a corresponding pulley 86. A plurality of closed belts 94 pass around respective pairs of pulleys 86, 87. These belts together form a high-speed delivery conveyor.

A slow-speed conveyor for receiving the bacon slices from the cutting mechanism is located at said one end of the frame member 43 and includes two parallel shafts 89, 90 journaled between the sidewalls 50, 51 each shaft 89, 90 having a plurality of equally spaced pulleys 91, 92 rigidly mounted thereon. Pairs of pulleys on the shafts 89, 90 are located opposite one another and are connected by respective closed belts 93. The pulleys of the delivery conveyor and of the slow speed conveyor are arranged such that one end of each belt 94 is adjacent an end of a belt 93. The carrying surfaces of the belts 93, 94 being coplanar. Thus there is a substantially uniform gap between each adjacent pair of belts 94 which is continued between each respective pair of belts 93 which is continued between each respective pair of belts 93 so that the uniform gaps extend substantially along the whole length of the frame member 43.

The slow-speed conveyor is driven by a variable speed drive through a series of pulleys 95 whereby the speed is adjusted to the required amount of overlap in the shingling.

The carriage 64 has a beam 96 rigidly attached thereto, the beam 96 extending horizontally above the belts and perpendicular to the longitudinal axis of the frame member 43. A plurality of fingers 97 are rigidly attached by their respective ONE ends to the beam 96 and extend substantially horizontally in the direction of said one end of the frame member 43. Each finger 97 lies parallel to and above the carrying surface of a respective belt 93 ro 94, depending on the position of the carriage 64.

The carriage 64 has a boss 98 located thereon at a vertical level below that of the beam 96, the boss including a cylindrical bore 99 the axis of which is parallel to that of the beam 96. Journaled in a sleeve within said bore 99 is a second beam 100. This beam 100 has a further plurality of fingers 101 rigidly attached thereto which are each supported by the beam so as to be parallel to and in the vertical plane of a space between adjacent ones of the belts 93, 94 and all of which fingers 10!1 extend in the direction towards said one end of the frame member 43. Each finger 101 has a width slightly less than the gap between adjacent belts 92 or 93 and is aligned to be movable in a respective one of said gaps when the beam 100 is rotated.

One end of the beam 100 projects from the carriage 64 through the boss 98 in a direction towards the crank arm 61. Rigidly attached to this one end of the beam 100 is a member 102 (dotted in FIG. 5) having a yoke portion 103. The yoke portion 103 engages a horizontal pin 104 carried by a swinging member 105 which member 105 is rotatably mounted on the frame member 43 by a pivot 106. The swinging member 105 has a kinked guide surface 107 which slidingly engages a cam follower on the crankpin 83. The components are so arranged that when the guide pulley is reciprocated in the slot 84, the swinging member 105 is rocked by the crank pin 83. This rocking movement is transferred via the pin 104 and yoke 103 to the beam 100, thus raising or lowering the free ends of the fingers 101 relative to the belts 93 or 94. It is further arranged that the maximum height reached by the free ends of the fingers 101 is just below the horizontal level of the fingers 97 and the minimum height is below the conveyor belts 93, 94. The rest position of the crank arm 61 is 180° from the position shown in FIG. 3.

When the crank 61 is rotated in the direction indicated by the arrow in FIG. 5, the carriage 64 is horizontally reciprocated between the rails 62, 63 from the position shown in FIG. 3, in which the free ends of both sets of fingers 97, 101 are in the region of the input end of the slow speed conveyor adjacent said one end of the frame member 43, to the position corresponding to 180° rotation of the crank arm 61 in which the free ends are both sets of fingers 97, 101 are adjacent the delivery conveyor.

In FIG. 5 the crank is shown in its horizontal position. The guide pulley 85 is moving upwards and is just about to engage the guide surface 107 of the swinging member 105. The guide surface 107 is kinked below the point 108 to ensure that the guide pulley does not engage the surface 107 when it is below the vertical level it occupies in FIG. 5. When the guide pulley 85 moves upwards and engages the surface 107, the swinging member 105 is rocked clockwise (as seen in FIG. 5) and the yoke and beam 100 rotated anticlockwise. The free ends of the fingers 101 are thus raised as the carriage begins to move to the left (as seen in FIG. 5). Shingled bacon slices which have been laid on the slow-speed belts 93 are thus picked up and trapped between the fingers 101 and 97. The fingers 101 remain in this raised trapping position while the carriage is moved to its maximum left-hand position (FIG. 5). As the crank continues to rotate, the guide pulley breaks contact with the guide surface 107 and the fingers 101 move downwards again below the level of the belts 94, thus depositing the bacon slices on these belts 94 as the carriage is returned towards the position of FIG. 5.

Means are provided (not shown) for electronically counting the number of slices of bacon which have been dropped onto the slow-speed "shingling" conveyor 62 and when this has reached a preset figure, the counter emits a signal which triggers a solenoid arranged to engage a clutch and initiate a single revolution of the crank arm 61 and the resulting transfer by the two sets of fingers of the bacon on the shingling conveyor 62 to the delivery conveyor 65.

The number of slices of bacon which have been cut can be counted by attaching a magnet at a suitable position on one of the rotor arms 17, 18 so that it passes near to a corresponding detecting unit as the rotor is rotated.

A slice control unit may also be provided which is adapted to record the impact of each slice as it lands on the slow-speed shingling conveyor 62. This may be accomplished either by mounting this conveyor 62 on a weighing head or by running the belts 63 of the conveyor over floating rails carried on a weighing head. The size of each impact is proportional to the mass of each slice, so that a succession of signals is available to adjust the variable speed control on the feed unit so as to maintain the slice weight substantially constant.

I claim:

1. Apparatus for slicing solid food material comprising:
a frame;
an elongated rotor journaled on said frame for rotation about a horizontal axis;
two circular cutting blades journaled on the rotor for rotation about axes slightly inclined relative to the rotational axes of the rotor, the two blades being located adjacent the two ends respectively of the rotor;
a driving pulley coupled to each cutting blade respectively;
a driving shaft for the rotor;
a double pulley journaled coaxially about, but rotatable independently of, said rotor driving shaft;
belt means engaging one pulley portion of said double pulley and both said driving pulleys of the cutting blades;
motor means;
second belt means drivingly connecting said motor means to the other pulley portion of said double pulley; and
means for rotating the driving shaft of the rotor in the opposite rotational direction to that of the double pulley.

2. Apparatus according to claim 1 further comprising spiked conveyor means located on said frame for continuously feeding and presenting pieces of cooked meat to said cutting blades, and means for varying the feeding speed of said spiked conveyor means to enable the thickness of slices cut by the blades to be adjusted.

4. Apparatus according to claim 1 in which batching means are located on said frame beneath said cutting blades, said batching means comprising slow conveyor means, fast conveyor means, carriage means reciprocable between said fast and slow conveyor means, a plurality of fixed fingers carried by said carriage, a plurality of movable fingers carried by said carriage, means for moving said movable fingers towards said fixed fingers to trap therebetween and pick up slices of meat carried by said slow conveyor means, and means for moving the carriage between said slow and fast conveyor means and releasing the trapped slices onto said fast conveyor means.

4. Apparatus according to claim 3 in which the slow and fast conveyor means each comprise an equal number of parallel, spaced-apart belts and a plurality of pairs of pulleys over each of which runs a respective belt, each space between adjacent belts on said slow conveyor means being aligned with a corresponding space between adjacent belts on said fast conveyor means, the carrying surfaces of the fast and slow conveyor means being substantially coplanar, said fixed fingers being carried by said carriage above the level of said carrying surface of said two conveyor means, and a beam located below said level and supporting said movable fingers.

5. Apparatus according to claim 4 in which each fixed finger is located parallel to and above a corresponding said belt and each said movable finger is located by said beam parallel to and in the vertical plane of a corresponding space between adjacent belts so that, when said beam is angularly displaced, respective portions of said movable fingers extend above said surface level to pick up slices of meat carried by said belts and to trap them against said fixed fingers.

6. Apparatus according to claim 5 comprising means for rotating upwardly said portions of said movable fingers when the carriage is adjacent said slow conveyor means whereby to pick up slices of meat from the slow conveyor means, means for retaining the fingers in their trapping position while the carriage is moved towards said fast conveyor means, and means for rotating downwardly said movable fingers when the carriage is adjacent said fast conveyor means whereby to release said slices onto said fast conveyor means, means being provided for retaining the movable fingers in their downwardly rotated position while the carriage is returned towards the slow conveyor means.

7. Apparatus according to claim 6 in which said carriage-reciprocating means comprises a rotatable crank on said batching device, means defining a vertical slot in said carriage, a pin carried by said crank and slidably received in said slot, and an angularly displaceable cam rigidly attached to said beam, the pin being arranged, during at least part of a revolution of said crank, to engage said angularly displaceable cam for providing said angular movement of the movable fingers when the carriage is reciprocated between said conveyors.

8. Apparatus according to claim 7 further comprising means for detecting the impact of each slice as it lands on said slow speed conveyor means and for adjusting the speed of said spiked conveyor means accordingly so as to maintain the slide weight constant.

* * * * *